(12) United States Patent
Rhein et al.

(10) Patent No.: US 6,450,576 B1
(45) Date of Patent: Sep. 17, 2002

(54) UNIVERSAL ATTACHMENT FOR CHILD CAR SEAT

(75) Inventors: John F. Rhein, Hamburg; Ronald M. Asbach, Grand Island, both of NY (US)

(73) Assignee: Mattel, Inc., El Segundo, CA (US)

( * ) Notice: Subject to any disclaimer, the term of this patent is extended or adjusted under 35 U.S.C. 154(b) by 42 days.

(21) Appl. No.: 09/598,989

(22) Filed: Jun. 22, 2000

(51) Int. Cl.$^7$ .................................................. A47C 1/08
(52) U.S. Cl. ................................................. 297/250.1
(58) Field of Search ........................... 297/250.1, 254, 297/256.14, 256.16, 256.1, 468

(56) References Cited

U.S. PATENT DOCUMENTS

| | | | |
|---|---|---|---|
| 1,397,281 A | 11/1921 | Haas | |
| 1,429,867 A | 9/1922 | Goldsmith | |
| 1,967,533 A | 7/1934 | Koop | 155/131 |
| 2,308,315 A | 1/1943 | Smith | 155/10 |
| 2,664,140 A | 12/1953 | Kindelberger | 155/11 |
| 2,777,502 A | 1/1957 | Travis | 155/10 |
| 2,875,816 A | 3/1959 | Langefeld | 155/131 |
| 3,167,790 A | 2/1965 | Hickey | 5/332 |
| 3,388,947 A | 6/1968 | Rosen | 297/250 |
| 3,404,917 A | 10/1968 | Smith | 297/250 |
| RE29,841 E | 11/1978 | Wener | 297/250 |
| 4,345,791 A | 8/1982 | Bryans et al. | 297/250 |
| 4,480,870 A | 11/1984 | von Wimmersperg | 297/216 |
| 4,768,828 A | 9/1988 | Kohketsu | 297/250 |
| 4,854,638 A | 8/1989 | Marcus et al. | 297/250 |
| 4,913,490 A | 4/1990 | Takahashi et al. | 297/250 |
| 5,031,960 A | 7/1991 | Day | 297/254 |
| 5,118,163 A | 6/1992 | Brittian et al. | 297/250 |
| 5,286,085 A * | 2/1994 | Minami | 297/250.1 |
| 5,466,044 A | 11/1995 | Nagasaka et al. | 297/250.1 |
| 5,487,588 A | 1/1996 | Burleigh et al. | 297/253 |
| 5,524,965 A | 6/1996 | Barley | 297/256.16 |
| 5,536,066 A | 7/1996 | Sedlack | 297/250.1 |
| 5,630,645 A | 5/1997 | Lumley et al. | 297/250.1 |
| 5,695,243 A | 12/1997 | Anthony et al. | 297/250.1 |
| 5,918,934 A | 7/1999 | Siegriest | 297/250.1 |
| 5,941,601 A | 8/1999 | Scott et al. | 297/253 |
| 5,957,531 A | 9/1999 | Kane et al. | 297/256.14 |
| 5,971,479 A | 10/1999 | Jacquemot et al. | 297/256.14 |
| 6,000,753 A | 12/1999 | Cone, II | 297/256.16 |
| 6,017,087 A | 1/2000 | Anthony et al. | 297/250.1 |
| 6,024,408 A | 2/2000 | Bello et al. | 297/250.1 |
| 6,048,028 A | 4/2000 | Bapst | 297/250.1 |
| 6,193,310 B1 | 2/2001 | Batalaris et al. | 297/253 |
| 6,267,442 B1 * | 7/2001 | Shiino et al. | 297/250.1 X |
| 6,273,505 B1 * | 8/2001 | Carnahan | 297/250.1 |

FOREIGN PATENT DOCUMENTS

| | | | |
|---|---|---|---|
| DE | 3441543 | 6/1985 | |
| EP | 0164909 | 12/1985 | |
| EP | 0714806 | 1/2000 | |
| EP | 0982182 | 3/2000 | |
| EP | 1059 194 A1 | 12/2000 | |
| FR | 2641236 * | 7/1990 | 297/250.1 |
| GB | 2143727 | 2/1985 | |
| GB | 22281261 * | 3/1995 | 297/250.1 |
| JP | 4342621 | 11/1992 | |

* cited by examiner

Primary Examiner—Peter M. Cuomo
Assistant Examiner—Stephen Vu
(74) Attorney, Agent, or Firm—Morgan Lewis & Bockus LLP

(57) ABSTRACT

A child car seat is mounted in a passenger seat of a vehicle. The car seat includes an universal anchoring attachment that is positionable along a tube when converting between forward and rearward facing positions. The tube may also function as a seat belt pathway for restraining the car seat using a vehicle supplied seat belt.

20 Claims, 7 Drawing Sheets

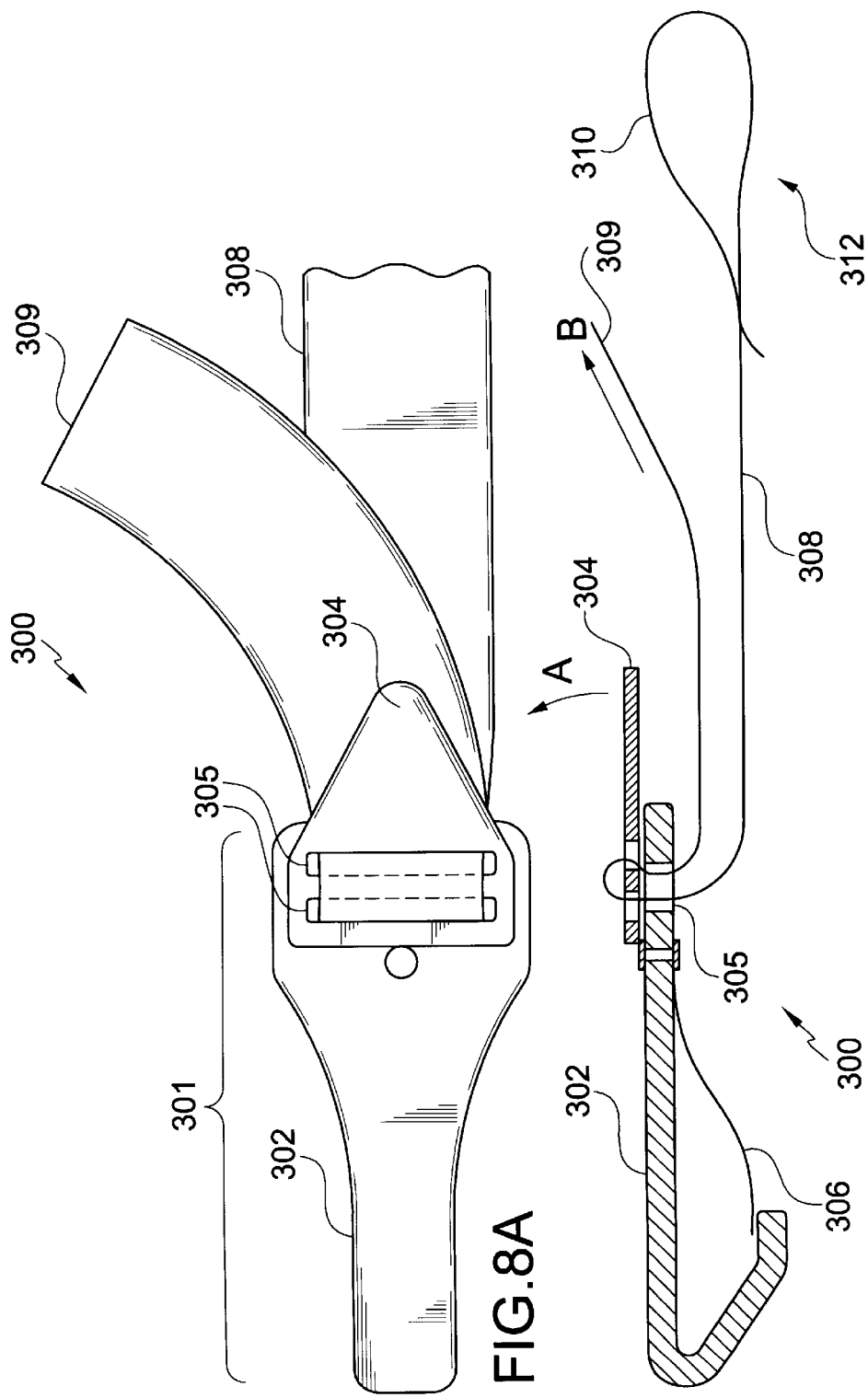

UNIVERSAL ATTACHMENT FOR CHILD CAR SEAT

The invention relates broadly to a child car seat for the protection and restraint of a child or infant while in a vehicle. More specifically, the invention relates to a convertible car seat having an improved universal attachment that provides convenient and effective relocation of the universal attachment for converting between a rearward facing and forward facing child car seat restraint.

BACKGROUND OF THE INVENTION

Vehicles, such as cars and vans, are presently equipped with occupant restraining seat belts installed by manufacturers of automobiles. While such seat belts are adequate for restraining adults in the event of a sudden stop, collision or other emergency, most are inadequate for protecting of small children and infants. As a result, a variety of specially designed child restraint devices have been designed and developed and are in widespread use today. Child car seats are indeed required by all states as a matter of law for use with infants and children who are of such size that a standard vehicle seat belt does not afford adequate protection. Conventional child car seats typically utilize the vehicle seat belt provided by the vehicle manufacturer to secure the child seat to the vehicle.

Most vehicles today come equipped with a three-point seat belt system, which is either formed from a lap belt and a shoulder harness joined together in a non-movable latch plate or one continuous belt having a movable or dropping latch plate separating the lap belt portion from the shoulder harness portion. In either configuration, the latch plate is coupled together at one end for releasable securement by the wearer to a buckle at a first fixed point on the car seat adjacent the wearer. The lower belt is the horizontal lap belt extending over the wearer's lap to an adjacent second fixed point. The second or shoulder belt extends transversely from the buckle or anchor, angling upwardly across the wearer's chest and shoulder, to an elevated fixed third point.

Convertible child car seats, i.e., seats capable of being used in a rear-facing or forward facing orientation, are well known in the field. Depending on the desired orientation, the vehicle seat belt must generally be threaded through the child car seat in a different way to securely fasten the seat to the vehicle. See, for example, Kain, U.S. Pat. No. 4,764,999. The improper installation of a child car seat in a vehicle, in either orientation, is a very real possibility. It is a matter of law in all states that a child weighing less than 20 pounds (or generally one year of age) must be placed in a child car seat secured in a vehicle in a rear-facing, more reclined direction until their body develops sufficiently and can withstand the forces involved in a crash when forward facing. Once the child weighs more than 20 pounds, the child may be secured in the car seat positioned in a forward-facing, more upright orientation.

New Federal safety standards under FMVSS213 and 225 now require performance that mandates a tether system that secures the child car seat to the vehicle frame. Typically, three anchor points are provided by the vehicle manufacturer: one point located between the seat back of the vehicle rear seat and the vehicle parcel shelf, and two points located at or near the seat bight (i.e., the junction of the vehicle seat bottom and the vehicle seat back). A center tether is secured to the vehicle anchor located on the rear parcel shelf. Left and right side tethers are secured to the vehicle anchors located at or near the seat bight. This tether anchoring system permits the child car seat to be secured to hard points of the vehicle without relying on the vehicle's seat belts. Standard FMVSS225 further requires that child car seats must be capable of attaching to a vehicle's permanent anchors, as well as the vehicle seat belts.

It is known to provide a car seat tether system with one set of attachments to accommodate a forward-facing position and another set of attachments to accommodate a rearward-facing position for the child car seat. However, the known convertible child car seats which provide a tether anchoring system that are convertible between a forward-facing and rearward-facing position suffer from one or more of following drawbacks. The seats are either complicated to operate, expensive to manufacture, or do not provide a restraint configuration with ease of conversion between forward and rearward positions. Some convertible child car seats require tools to convert the tether anchoring system between the two positions. Other convertible child car seats may pivot the tether about a center point without changing the position of the tether on the car seat.

In view of the foregoing disadvantages and drawbacks in the known convertible car seats utilizing a tether system, there is a need for a convertible car seat that is cost effective, easily converted between the forward-facing and rearward-facing positions, and that provides a reliable restraint for both rearward and forward car seat positions.

SUMMARY OF THE INVENTION

The needs identified above are met, and the shortcomings of prior art car seat designs overcome by the car seat of the present invention. In one aspect, the present invention provides a child restraint for mounting in a passenger seat of a vehicle, the child restraint including a seat body having a child support area disposed on an upper surface thereof and left and right elongate frame members extending from the upper seat back portion to the seat body forward end along the respective left and right sides of the seat body. The child restraint further includes left and right anchor attachments for securing the seat body to the left and right vehicle anchors, each of the left and right anchor attachments including an attachment end coupled to the respective left and right elongate frame members, and an engagement end for connecting the left and right anchor attachments to the respective left and right vehicle anchors located at the vehicle seat bight, wherein the attachment end of the left and right anchor attachment is positionable along the respective left and right elongate frame members between a forward anchor point proximate the forward end for configuring the seat body as a rearward facing car seat and a rearward anchor point proximate the upper back portion for configuring the seat body as a forward facing car seat.

Bars may be used as left and right elongate frame members, such as tubular shaped bars. The elongate frame members may also correspond to a support structure defining a continuous tubular frame of the car seat or a frame member defining a seatbelt pathway for a vehicle seat belt restraint.

The left and right anchor attachments may correspond to a left and right strap each having a first and second end, the first end being secured to the respective left and right elongate frame members and the second end being connected to a latching member for securing the seat body to the respective left and right vehicle anchor. In one particular embodiment, the left and right strap are secured by forming a loop around the respective left and right elongate frame member so as to provide slidably positionable straps for configuring between the forward and rearward facing car seat.

In another aspect of the invention, a child car seat is configurable as both a rearward and forward facing car seat and securable to the left and right vehicle anchors and includes a seat body, a left and right tether, each of which including a first end adapted for releasably securing the left and right tether at the respective left and right vehicle anchor and a second end fixedly retaining the left and right tether to left and right anchoring members fixed to the seat body, wherein the left and right tether are secured to the respective left and right vehicle anchor and extend from the left and right vehicle anchor to the forward anchoring point when the seat body is configured as the rearward facing car seat, and wherein the left and right tether are secured to the respective left and right vehicle anchor and extend from the left and right vehicle anchor to the rearward anchor point when the seat body is configured as the forward facing car seat.

In another aspect of the invention there is provided a method for converting a child car seat from a forward facing child car seat to a rearward facing child car seat, the method including the steps of releasing a latching end of each of a left and right tether from the respective left and right vehicle anchors rotating the seat body from a rearward facing to a forward facing position on the vehicle seat, sliding the coupling end of each of the left and right tether along the respective left and right anchoring member so as to re-position the coupling end from the first position to the second position, and attaching the latching end of each of the left and right tether to the respective left and right vehicle anchor.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings:

FIGS. 8a–8b are top and side views, respectively, of one embodiment of an anchoring restraint of the invention.

DETAILED DESCRIPTION

Figure 1:
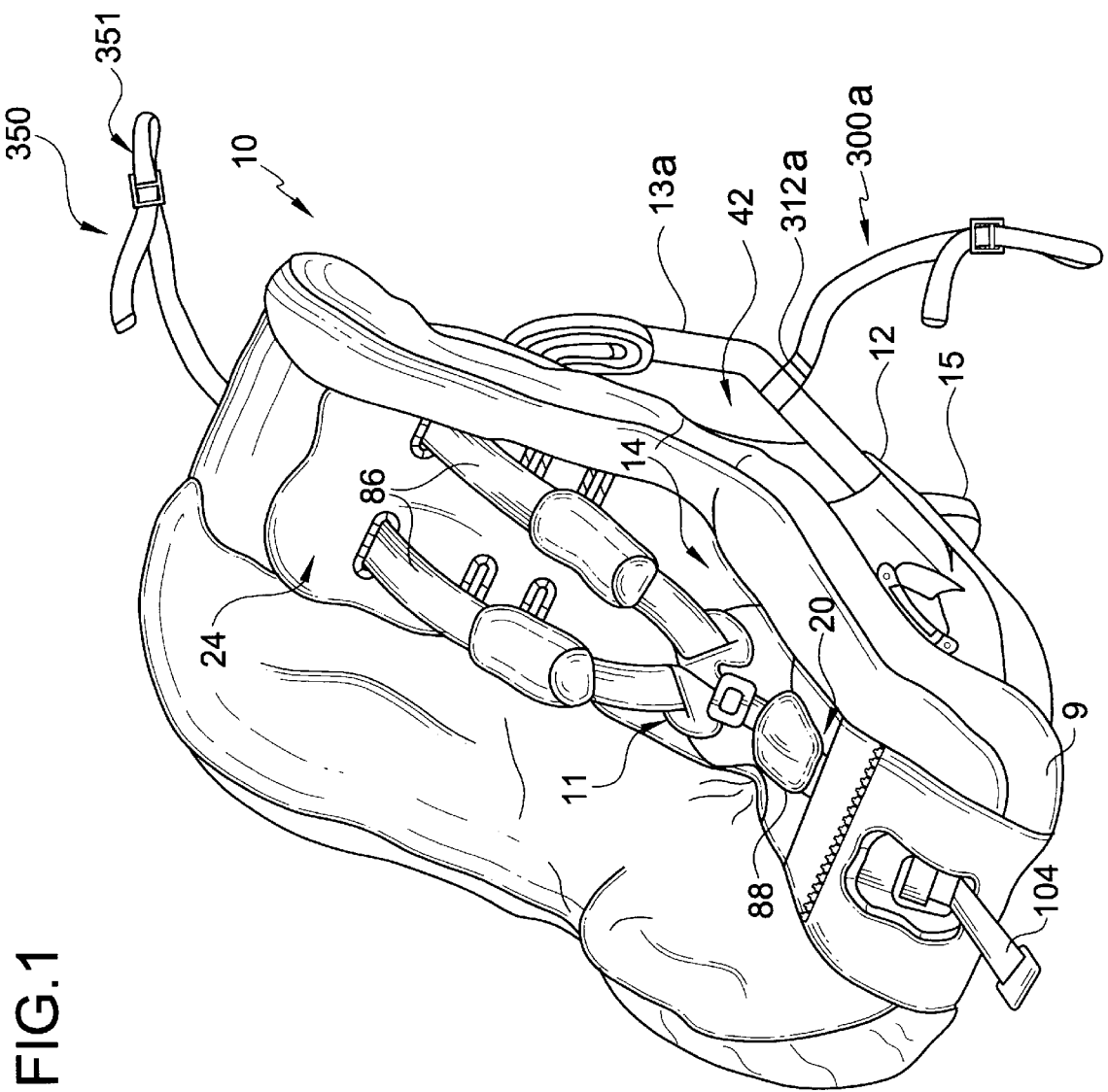
FIG. 1 is a front perspective view of a preferred convertible child car seat including an anchoring restraint system constructed in accordance with the principles of the invention.
Figure 2:
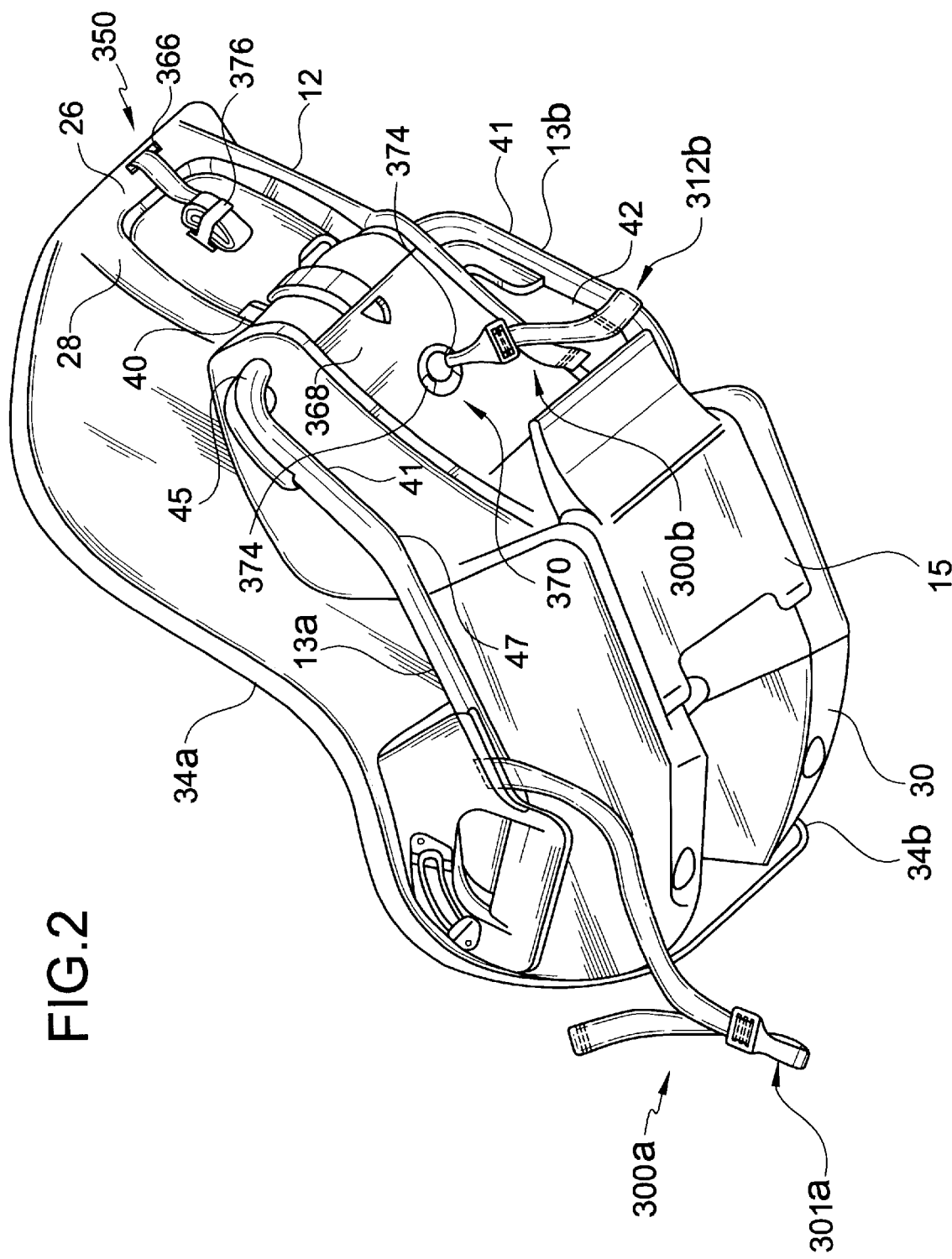
FIG. 2 is a rear perspective view of the child car seat of FIG. 1 showing a center and one side anchoring attachment in a storage position.
Figure 3:
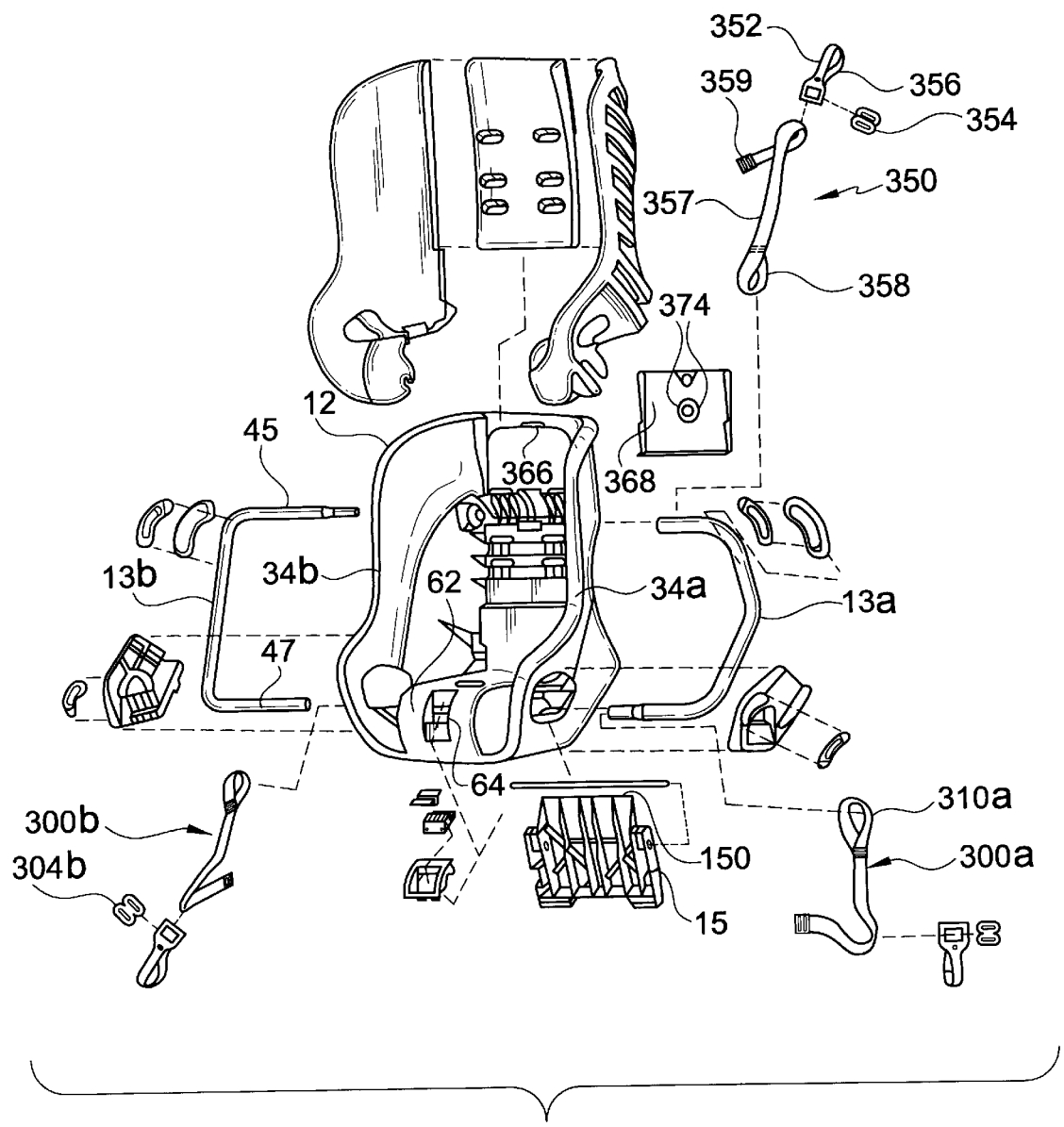
FIG. 3 is an exploded perspective view of the child car seat of FIG. 2.

Reference will now be made in detail to presently preferred embodiments of the invention, examples of which are illustrated in the accompanying drawings. As depicted in FIGS. 1–3, a preferred embodiment of a child restraining system includes a unitary plastic shell or main body 12, an attached child restraint harness 11, a pair of tubes 13a, 13b, a rear leg or kickstand 15, a cushion 9, side anchoring attachments 300a, 300b, and a center anchoring attachment 350. Car seat 10 may be used as a forward or rearward facing car seat securable in vehicle seat using a vehicle supplied lap and shoulder belt restraint. Such a use is described in U.S. Pat. No. 5,957,531, the disclosure of which is incorporated herein in its entirety. In the preferred embodiment of the invention, car seat 10 is adapted as a forward or rearward facing car seat securable to the vehicle seat by a two and three point anchor restraint system.

Figure 4:
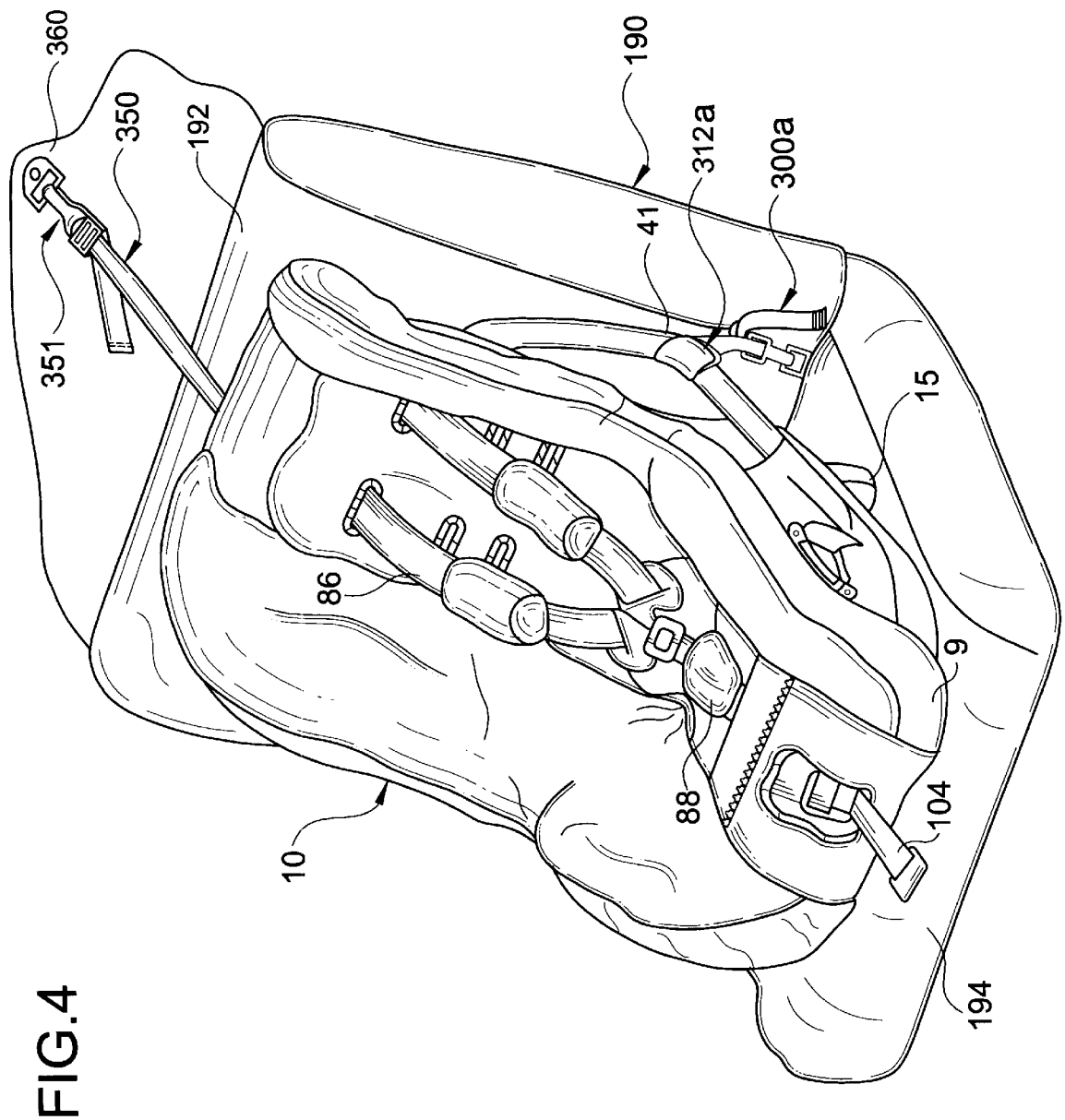
FIGS. 4 and 5 are perspective and side views of the child car seat of FIG. 1 in a forward-facing orientation secured to the vehicle anchors located at the seat bight and rear parcel shelf.
Figure 5:
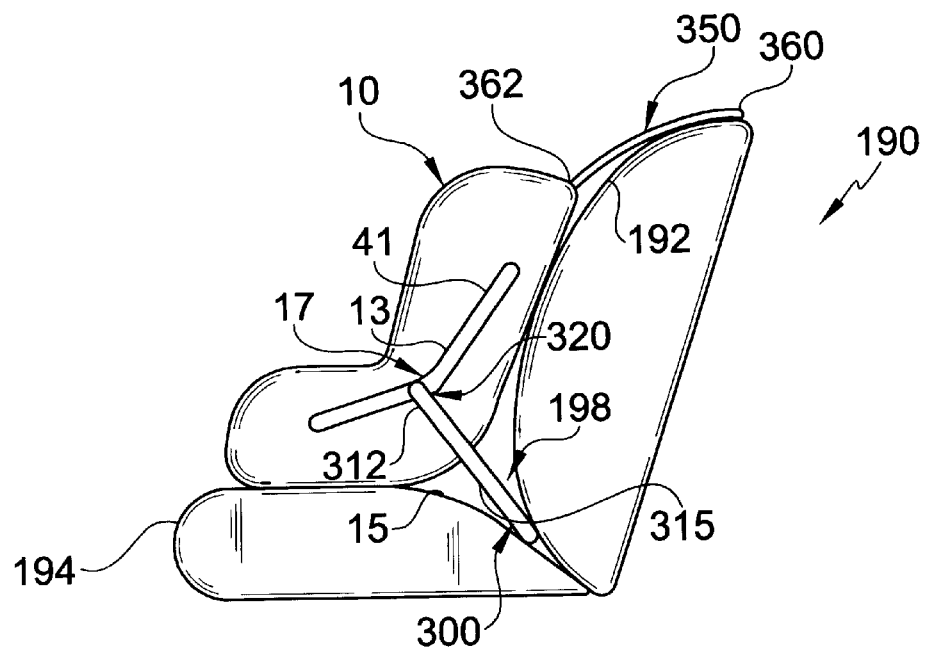
Figure 7:
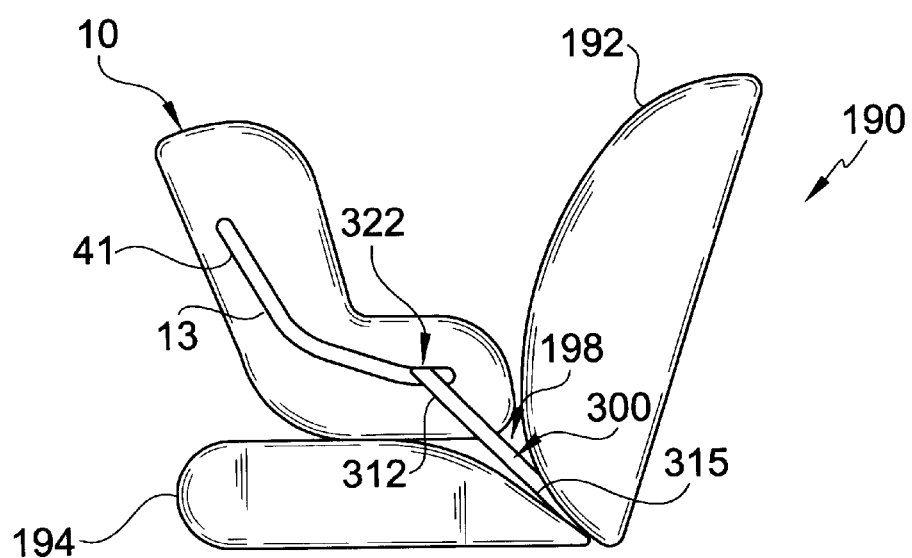
FIGS. 6 and 7 are perspective and side views of the child car seat of FIG. 1 in a rear-facing orientation secured to the vehicle anchors located at the seat bight.
Figure 6:
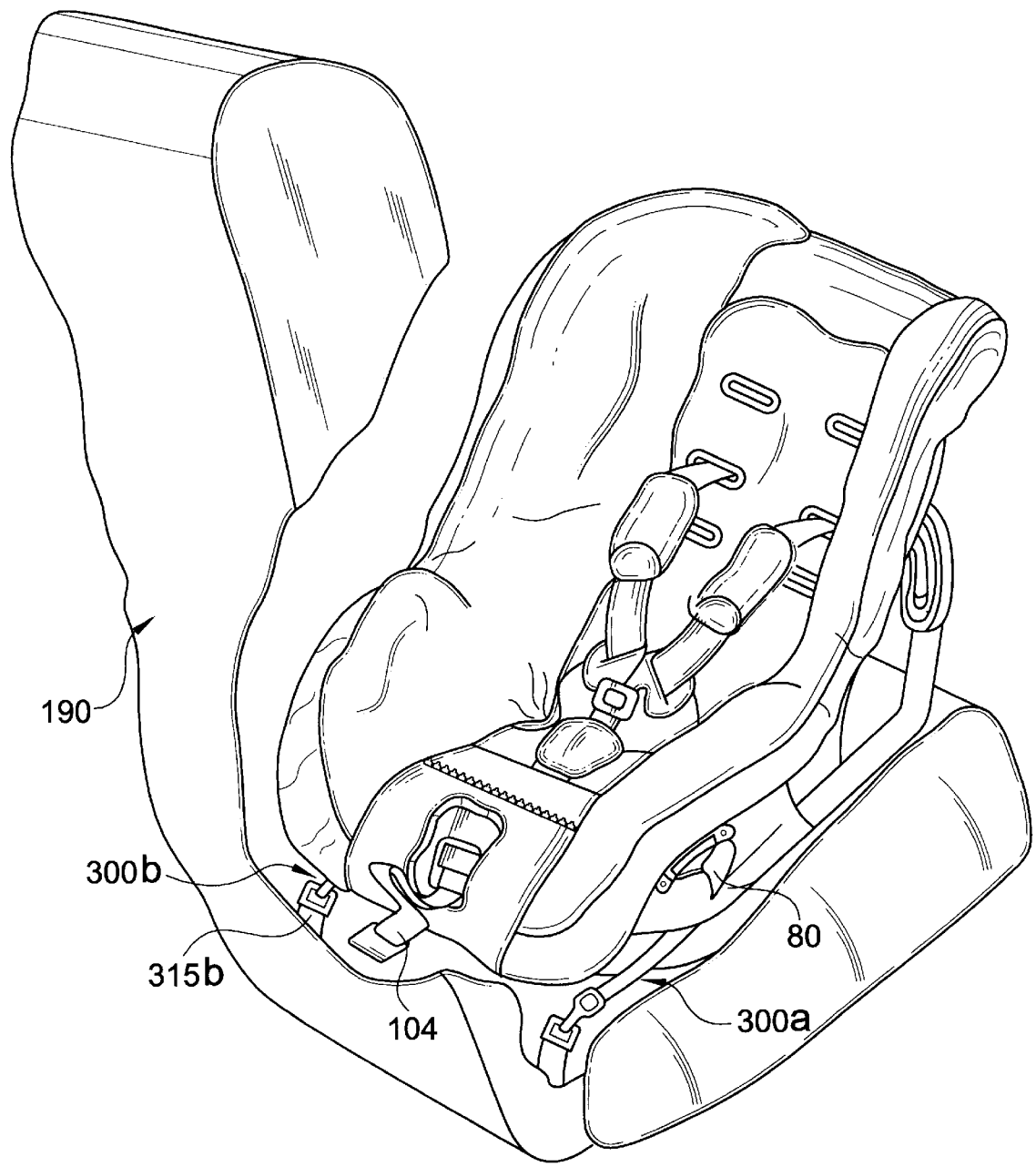

The anchoring restraint system of the preferred embodiment includes a pair of side anchor attachments 300a, 300b coupled to tubes 13a, 13b of the car seat 10 in a such a manner as to allow repositioning of the anchor attachment 300 to accommodate a forward facing car seat use, FIGS. 4 and 5, and a rearward facing car seat use, FIGS. 6 and 7. In other embodiments, a tether assembly including right and left tethers may be coupled to tubes 13a, 13b or other structure suitable for repositioning tethers between forward and rearward facing car seat use, such as left and right elongate frame members or left and right anchoring members. Preferably, anchor attachments 300a, 300b include a strap or webbing 308. Attached at one end of the side anchoring attachment 300 is an engagement device 301 that is received in the vehicle supplied permanent anchor 315. The strap attachment to the car seat defines a forward facing anchor point 320 and a rearward facing anchor point 322 located near the front and rear ends of the car seat 10, respectively. In the forward facing position, a center anchor attachment 350 including a strap 357 and a center engagement device 351 receivable in the vehicle supplied center permanent anchor 360 is provided as an additional restraint. For rearward facing car seat use, it is preferred to use only the side anchor attachments 300a, 300b, although the center anchor attachment 350 may also be used. FIGS, 4–7 illustrate the forward facing anchor point 320 and rearward facing anchor point 322 for the child restraining system 10 of the preferred embodiment. Side anchor attachments 300a, 300b are adapted for being slidable along tubes 13a, 13b to allow convenient placement of the anchor attachments 300a, 300b relative to the vehicle seat bight 198 without the need for reattachment or significant re-adjustment of the anchor attachments 300 when converting between forward and rearward facing positions. This adjustment feature of the side anchor attachments 300 also does not require that a user remove the anchor attachment and then re-attach the anchor attachment when converting between forward facing and rearward facing positions. Additionally, the tether anchor system of the preferred embodiment provides a convenient and easy to use system that varies the car seat anchor points 320, 322 so as to reduce the length of the anchor attachments 300 needed to reach the vehicle anchor points in both forward facing and rearward facing positions and, furthermore, allows positioning of the anchor attachment at an optimal angle for load transfers to and from the vehicle to car seat 10. This aspect of the invention also allows a relatively short anchor attachment for forward and rearward car seat uses, thereby reducing the instances of excessive, unwanted motion of the car seat caused by the minimum fully tightened length being too long to obtain a tight fit in some vehicles. This short anchor attachment length will ensure the child restraint is optimally compatible to the wide variety of available vehicles.

The major components of the car seat of the preferred embodiment will now be described with reference to FIGS. 1–3. The main body 12 has a generally arcuate or curved child support area 14 to receive a child or infant in a sitting position. The child support area 14 of the main body 12 includes a lower seat portion 20 upon which a child may sit, and an upper back portion 24 for supporting the back of a child. The main body 12 also includes an exterior surface 26 adapted to contact the vehicle seating surface. In particular, the exterior surface 26 of the main body 12 includes an exterior upper back portion 28 adapted to contact the vehicle seat back and a lower base portion 30 adapted to contact the vehicle seat bottom or seat pan. The main seat body 12 also includes a pair of laterally-spaced sidewalls 34a, 34b to prevent a child seated therein from excessive lateral movement. The main body 12 and cushion 9 may have one or more slots or grommets 40 therethrough to accommodate harness adjustment fixtures. The car seat includes a unitary plastic main body having an energy absorbing foam insert.

The placement and securing of a child in car seat 10, including the operation of the attached child harness 11, kickstand 15 for adjusting the inclination of the car seat between forward and rearward facing car seat uses, and the securing of the car seat with a vehicle supplied lap and shoulder belts, is the same as described in U.S. Pat. No. 5,957,531, the description of which is incorporated by reference in its entirety. The child restraint harness 11 is coupled to car seat 10 to restrain a child in child support area 14. The child restraint harness 11 includes a pair of shoulder straps 86 coupled to a crotch strap 88. Shoulder straps 86 are preferably attached to crotch strap 88 by means of buckles and latch plates. Shoulder straps 86 and the crotch strap 88 cooperate to provide a five-point child restraint to retain the child in child support area 14. A tensioning strap 104 is permanently attached to a three-way connector (not shown) to lock shoulder straps 86 in position. As shown in FIGS. 2–5, car seat 10 further includes a pivotally attached rear leg or kickstand 15 which functions as a seat recline adjuster. In the forward facing orientation, rear leg 15 is pivoted out such that a distal end extends away from seat body 12 and into the vehicle seat, thereby providing proper positioning and a more secure fit. The extended position of rear leg 15 allows the seat to have a more upright position, as opposed to a more reclined position, which is preferable for a toddler or young child who is more alert and active. In the rearward facing orientation, rear leg 15 is pivoted to retract into or below seat body 12 so that the child seat assumes a more reclined position, which is preferable for an infant who does not generally have adequate muscle strength to hold up his/her head.

As can be seen in FIGS. 4–7, car seat 10 is adapted to be positioned upon a vehicle seat 190, in either a rearward facing or forward facing orientation. In the forward facing orientation, exterior upper back portion 28 contacts generally vertical back support surface 192 of the vehicle seat, and lower base portion 30 contacts vehicle seat bottom 194 or pan. In the rearward facing orientation, exterior upper back portion 28 faces away from back support surface 192 of the vehicle seat, and lower base portion 30 contacts the vehicle seat bottom 194 or pan. The preferred embodiment of the car seat includes a continuous loop of steel tubing 13 having two substantially horizontal transverse portions 45, 47 and two substantially downwardly and forwardly extending side portions 41. The side portions 41 preferably include a bend 17 conforming generally to the shape of the seat. Transverse portions 45, 47 extend through sidewalls 34a, 34b and are securely attached to, or fitted through, the upper and lower portions of the seat. The upper transverse portion 45 provides strength and support to the seat. The lower transverse portion 47 provides support and structural integrity and also provides a place to securely mount the child restraint harness 11.

The downwardly extending tube portions 41 preferably extend diagonally downward along the sides of the car seat 10, toward a front lower portion of the seat, and are at a spaced relationship thereto, thus creating a passageway 42 between the tubes 13 and the sidewalls 34a, 34b of car seat 10. In the preferred embodiment, the middle portion of the side walls 34a, 34b, or that portion located beneath tubes 13, is cut away to allow a more rounded transition from the side wall 34a, 34b to exterior upper back portion 28 and allows greater access by a hand or arm for easier installation of a vehicle seat belt. In the rearward facing position, the vehicle seat belt is passed through one of the openings 80 in the side walls 34a, 34b of the seat 10, over the seating surface 62 and down through the opening on the opposite sidewall 34a, 34b. In the forward facing position, the vehicle seat belt pathway extends from the vehicle seat 190 partially around one of the tubes 13a, 13b, preferably just below the bend 17, through the adjacent passageway 42, behind the exterior upper back portion 28, through the opposite passageway 42 and then partially around the other tube 13 to engage a buckle portion of the seat belt. Preferably, the entry points are disposed along a line that passes through, or near, the center of gravity of the child seated in the car seat. This placement of the entry points reduces pitching moments applied to the car seat during an impact.

In the preferred embodiment, side anchoring attachments 300a, 300b, and a center anchoring attachment 350 are provided so that car seat 10 may be restrained either by the vehicle seat belt or the vehicle permanent anchors. For both side anchoring attachments 300 and center anchoring attachment 350, flexible straps are preferably used to transfer loads between the anchor points (e.g., anchor points 320, 322 and center anchor point 362) and the vehicle permanent anchors 315, 360. Side anchoring attachments 300 include an engagement device 301 located at one end for engaging the vehicle permanent anchor 315 and a car seat anchor coupling 312 located at the opposite end for engaging car seat 10. Vehicle permanent anchor 315 is provided by the vehicle manufacturer and includes an anchoring device such as a steel plate with an aperture or a loop. Engagement device 301 preferably includes a hook 302, a slide bar adjuster 304, a spring clip 306, an anchor coupling 312 is preferably a loop formed at the opposite end of strap 308, and a loop 310. As shown in FIGS. 8a, 8b, hook 302 is attached to flexible strap 308 by looping strap 308 through an aperture 303 in the hook 302 and around the slide bar adjuster 304. Flexible strap 308 may be made from any material known in the art, for example, webbing made from synthetic materials, like polyester or nylon, and such materials that are generally known. Spring clip 306 reduces the chance of hook 302 accidentally disengaging from loop 210 during use.

A variety of vehicle anchor devices may be used without departing from the scope of the invention; for example, a push button release buckle may be used as a vehicle engagement device, or any other off-the-shelf or future developed devices for securing a child car seat to a vehicle anchorage. However, vehicle engagement device 301 is preferred because it is a relatively low cost device to manufacture, as opposed to the more expensive buckle attachments used in other known car seats, automobiles and airline seats. Slide bar adjuster 304 is made from a rigid material such as stamped steel and formed to allow strap 308 to pass through apertures 305 in adjuster 304. Slide bar adjuster 304 may be shaped to allow leverage in rotating adjuster 304, as shown in FIGS. 8a, 8b. Anchoring attachments 300 are tightened when the tail end 309 of the strap 308 is pulled as shown in the direction B in FIG. 8b. When hook 302 is put in tension, slide bar adjuster 304 pinches strap 308 against the lower edge of hook 302 to prevent loosening. To loosen strap 308, slide bar adjuster 304 is rotated upwards in direction A, as shown in FIG. 8b, thereby releasing strap 308. Slide bar adjuster 304 provides a shorter assembled length which allows anchor attachment 300 to be used in situations where the point of attachment on the car seat and the vehicle anchor point are in close proximity. This feature of engagement device 301 is particularly desirable in situations where the assembled length of the latching system makes it difficult, if not impossible to properly secure and/or adjust the latching system in vehicles which provide restricted access to the vehicle permanent anchor, the car seat tether device, or where the car seat anchor point and vehicle anchor point are in close proximity to each other. Center engagement device 351 of center anchoring attachment 350 is constructed in a similar fashion to that of the engagement device 301 of the side anchoring attachments 300 discussed above.

As noted above, car seat anchor couplings 312a, 312b of the side anchoring attachments 300a, 300b are located along tubes 13a, 13b and are positionable between forward facing and rearward facing anchor points 320, 322, respectively. As shown in FIG. 1, car seat anchor coupling 312 is constructed by forming a loop 310 over tube 13. Loop 310a is formed by sewing an end of strap 308 back on itself; however, loop 310 may take on any form known in the art, such as a tube or other device capable of being repositioned along tube 13. Loop 310 may be formed by folding strap 308 over and fixing an end of strap 308 to itself with, for example, sewing, rivets, bolt system, clamp, or the like. With this construction, strap 308 easily slides over the length of tube 13 to provide proper positioning of the anchor attachments 300 for forward and rearward car seat use, as illustrated in FIGS. 4–7. Thus, tube 13 serves as both a seat belt pathway for securing the car seat using the vehicle supplied lap and shoulder belts (as noted above), as well as a plurality of anchor points for side anchor attachments 300.

Center anchor attachment 350 also includes a strap 357 and a center engagement device 351. Thus, center engagement device 351 includes a hook 352 with a spring clip 356, and an adjustable slide bar 354 operated in a similar method to that of engagement device 301 of side anchor attachments 300. Center anchor attachment 350 is attached to the substantially horizontal portion 45 of the tube 13 with a loop 358, as shown in FIG. 3. Strap 357 runs up exterior upper back portion 28 against main body 12 and through an aperture 366.

Referring to FIG. 2, storage devices are provided to store anchor attachments 300, 350 when the vehicle supplied seat belts are used to secure the car seat. Center anchor attachment 350 is folded and secured to the upper back portion of main body 12 using a storage device 376 which may include any method well known in the art, e.g., hook and loop fastener. A side anchor stowage unit 370 is provided to stow the side anchoring attachments 300. Side anchor stowage unit 370 is disposed on an exterior back plate 368 located on exterior upper back portion 28. Side anchor stowage unit 370 includes a raised portion having a circular aperture and a plurality of side attachment apertures 374 for receiving hooks 302 of the engagement devices 301 to secure side anchor attachments 300 in a stowed position.

In use, the position of the engagement devices 301 of side anchor attachment 300 is adjusted depending on whether the car seat is used in a forward or rearward facing position. In the forward facing orientation, FIGS. 4–5, car seat anchor point 320 is positioned by bend 17 of tube 13. The vehicle permanent anchors 315 are located between seat back support surface 192 and seat bottom 194, or seat bight 198. The center vehicle permanent anchor 360 is located at the rear parcel shelf or a fixed point behind the vehicle seat. Preferably, car seat anchor points 320 of side anchoring attachments 300 are positioned close to the seated child's center of gravity and car seat anchor point 320. This placement of car seat anchor reduces pitching moments applied to the car seat during an impact. Also, bend 17 is preferably positioned on tubes 13 so that anchor attachments 300 extend at about a 45 degree angle from the seat bight 198 when engaging tubes 13 just below the bend 17. In the forward facing orientation, rear leg 15 is rotated down and outwardly from the bottom of the car seat 10 to extend into the bight 198 of the vehicle seat 190. In the rearward facing orientation, FIGS. 6–7, side anchor attachments 300 are slid forward on tube 13 and attached to permanent vehicle anchors 315. FIG. 2 shows anchor attachment 300a in the rearward facing car seat position. Car seat anchor point 322 is located on tube 13 proximate a point where tube 13 enters the forward end of main body 12. In the rearward facing orientation, rear leg 15 is rotated into main body 12 such that the seat assumes a more reclined position.

What is claimed is:

1. A child restraint for mounting in a passenger seat of a vehicle, the passenger seat including a left and right vehicle anchor located along a bight of the passenger seat, said child restraint comprising:

a seat body having a child support area disposed on an upper surface thereof, said seat body including an upwardly extending back portion, right and left sides, and a lower seat portion extending from the back portion and terminating at a forward end of said seat body;

left and right elongate frame members of said seat body, said left and right elongate frame member extending from the back portion to the forward end along the respective left and right sides of said seat body; and left and right anchor attachments for securing said seat body to the left and right vehicle anchors, each of said left and right anchor attachments including:

an attachment end coupled to said respective left and right elongate frame members, and an engagement end for connecting said left and right anchor attachments to the respective left and right vehicle anchors;

wherein said attachment end of said left and right anchor attachment is slidingly positionable along said respective left and right elongate frame members between a forward anchor point proximate said forward end for configuring said seat body as a rearward facing car seat and a rearward anchor point proximate the back portion for configuring said seat body as a forward facing car seat.

2. The child restraint of claim 1, wherein said left and right elongate frame members are bars, each of which including a first transverse portion attached to the back portion, a second transverse portion attached to the forward end, and a side portion extending downwardly and forwardly from said first transverse portion to said second transverse portion.

3. The child restraint of claim 2, wherein said side portion includes a bend located proximate the back portion.

4. The child restraint of claim 2, wherein said bars define a continuous tubular frame having left and right sides wherein said left and right sides of said continuous tubular frame are coupled to said respective first transverse portion and said second transverse portion.

5. The child restraint of claim 1, wherein each of said left and right anchor attachments correspond to a left and right strap each having a first and second end, said first end being secured to said respective left and right elongate frame members and said second end being connected to a latching member for securing said seat body to the respective left and right vehicle anchors wherein said left and right straps carry a substantial portion of the car seat restraining loads to and from the left and right vehicle anchors to one of the forward and rearward anchor points when said left and right straps are secured to the respective left and right vehicle anchors.

6. The child restraint of claim 5, wherein said left and right strap are secured by forming a loop around the respective one of said left and right elongate frame members so as to provide slidably positionable straps along said left and right elongate frame members for configuring between the forward and rearward facing car seat.

7. The child restraint of claim 5, wherein said latching member includes a hook and a slide bar adjuster disposed above said hook, wherein said slide bar adjuster pinches the respective one of said left and right straps against said hook when said left and right straps are in tension, and releases said left and right straps when said slide bar adjuster is rotated away from said hook.

8. The child restraint of claim 1, the vehicle passenger seat further including a lap belt, wherein said left and right elongate frame members are adapted for providing a vehicle seat belt pathway for restraining said seat body using the lap belt, wherein the lap belt is positioned proximate said forward anchor point for configuring said seat body as the rearward facing car seat and said rearward anchor point for configuring said seat body as the forward facing car seat.

9. The child restraint of claim 1, wherein said engagement end of said left and right anchor attachments are coupled to the respective one of said left and right elongate frame members so as to be non-removable from said left and right elongate frame members and translatable between said forward and rearward anchor points.

10. The child restraint of claim 1, further including a center anchor attachment having first and second ends, the first end being coupled to said seat body and the second end being releasably securable to the vehicle.

11. The child restraint of claim 1, wherein said left and right elongate frame members comprise tubes.

12. A child car seat configurable as both a rearward and forward facing car seat and being adapted for mounting in a vehicle passenger seat by securing said child car seat to a left and right vehicle anchor located along a bight of the vehicle passenger seat, said child car seat comprising:

a seat body having left and right sides, an upper back portion defining a rearward end and a lower seat portion extending from the upper back portion and terminating at a forward end;

left and right anchoring members fixed to and extending along the respective left and right sides of said seat body, each of said left and right anchoring members defining a forward and rearward anchoring point for securing said seat body in the vehicle passenger seat; and a tether assembly including a left and right tether, each of which including a first end adapted for releasably securing said tether at the respective vehicle anchor and a second end fixedly retaining said tether to the respective anchoring member;

wherein said left and right tethers are secured to the respective left and right vehicle anchors and extend from said left and right vehicle anchors to said forward anchoring point when said seat body is configured as the rearward facing car seat, and wherein said left and right tethers are secured to the respective left and right vehicle anchors and extend from said left and right vehicle anchors to said rearward anchor point when said seat body is configured as the forward facing car seat.

13. The child car seat of claim 12, wherein said left and right anchoring members are fixedly coupled to said seat body at the forward and rearward ends of said seat body.

14. The child car seat of claim 12, wherein said left and right tethers are moveable along said respective left and right anchoring members without removing said left and right tethers from said left and right anchoring members.

15. The child car seat of claim 12, wherein said left and right anchoring members are further adapted for restraining said seat body in the vehicle passenger seat using a vehicle supplied lap belt.

16. The child car seat of claim 15, said seat body further including a stowage area comprising a flange formed on a rear face of the upper back portion, wherein when said seat body is secured in the vehicle passenger seat using a vehicle supplied lap belt and said left and right tethers are securable to said stowage area by connecting said first end of said left and right tethers to said flange.

17. The child car seat of claim 12, wherein said left and right anchoring members comprise tubes.

18. The child car seat of claim 12, where said left and right anchoring members define a vehicle seatbelt passageway.

19. A method for converting a child car seat from a forward facing child car seat to a rearward facing child car seat, the child car seat including a seat body having an upper back portion defining a rearward end and a lower seat portion extending from the upper back portion and terminating at a forward end, the seat body further including a left and right anchoring member extending from a first position proximate the forward end to a second position proximate the rearward end, wherein the forward facing child car seat is secured in a vehicle seat by a left and right tether, each of which having a coupling end and a latching end, the coupling end being slidably coupled to the respective one of the left and right anchoring member and the latching end being attached to a respective left and right vehicle anchor located at the vehicle seat bight, said method comprising the steps of:

releasing the latching end of each of the left and right tethers from the respective left and right vehicle anchors;

rotating the seat body from a rearward facing to a forward facing position on the vehicle seat;

sliding the coupling end of each of the left and right tethers along the respective left and right anchoring members so as to re-position the coupling end from the first position to the second position; and attaching the latching end of each of the left and right tethers to the respective left and right vehicle anchor.

20. The method of claim 19, including the steps of
providing a center tether securable to the seat body, wherein the center tether is latched to the vehicle seat when the child car seat is configured as a forward facing car seat; and
releasing the center tether from the vehicle seat when converting from the forward facing car seat to the rearward facing car seat.

* * * * *